United States Patent
Hrusecky et al.

(10) Patent No.: US 8,086,801 B2
(45) Date of Patent: Dec. 27, 2011

(54) LOADING DATA TO VECTOR RENAMED REGISTER FROM ACROSS MULTIPLE CACHE LINES

(75) Inventors: David A. Hrusecky, Cedar Park, TX (US); David S. Ray, Georgetown, TX (US); Bruce J. Ronchetti, Austin, TX (US); Shih-Hsiung S. Tung, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 12/420,118

(22) Filed: Apr. 8, 2009

(65) Prior Publication Data
US 2010/0262781 A1 Oct. 14, 2010

(51) Int. Cl.
*G06F 13/00* (2006.01)
(52) U.S. Cl. ........ 711/118; 711/119; 711/123; 711/124; 711/125; 711/135; 711/140; 711/141
(58) Field of Classification Search .................. 711/118, 711/119, 123, 124, 125, 135, 140, 141
See application file for complete search history.

(56) References Cited

U.S. PATENT DOCUMENTS

| 5,638,531 | A | * | 6/1997 | Crump et al. ................. 711/123 |
| 5,717,895 | A | * | 2/1998 | Leedom et al. ............... 711/140 |
| 5,893,145 | A | * | 4/1999 | Thayer et al. ................. 711/125 |
| 5,895,501 | A | * | 4/1999 | Smith ........................... 711/207 |
| 5,903,906 | A | * | 5/1999 | Pettey ........................... 711/118 |
| 6,112,297 | A | | 8/2000 | Ray et al. |
| 6,324,640 | B1 | | 11/2001 | Le et al. |
| 6,973,548 | B1 | * | 12/2005 | Vartti et al. ................... 711/141 |
| 6,983,347 | B2 | * | 1/2006 | Arimilli et al. ............... 711/141 |
| 7,500,049 | B2 | * | 3/2009 | Dixon et al. .................. 712/225 |
| 7,519,771 | B1 | * | 4/2009 | Faanes et al. ................. 711/118 |
| 2006/0179266 | A1 | | 8/2006 | Flood et al. |
| 2007/0255905 | A1 | | 11/2007 | Morrow |

* cited by examiner

*Primary Examiner* — Trong Phan
(74) *Attorney, Agent, or Firm* — Stephen R. Tkacs; Stephen J. Walder, Jr.; Diana R. Gerhardt (57) ABSTRACT

A load instruction that accesses data cache may be off natural alignment, which causes a cache line crossing to complete the access. The illustrative embodiments provide a mechanism for loading data across multiple cache lines without the need for an accumulation register or collection point for partial data access from a first cache line while waiting for a second cache line to be accessed. Because the accesses to separate cache lines are concatenated within the vector rename register without the need for an accumulator, an off-alignment load instruction is completely pipeline-able and flushable with no cleanup consequences.

20 Claims, 5 Drawing Sheets

LOADING DATA TO VECTOR RENAMED REGISTER FROM ACROSS MULTIPLE CACHE LINES

This invention was made with United States Government support under Agreement No. HR 0011-07-9-0002 awarded by DARPA. The Government has certain rights in the invention.

BACKGROUND

The present application relates generally to an improved data processing apparatus and method and more specifically to an apparatus and method for loading data to vector renamed registers from across multiple cache lines.

A microprocessor is the heart of a modern computer, a chip made up of millions of transistors and other elements organized into specific functional operating units, including arithmetic units, cache memory and memory management, predictive logic, and data movement. Processors in modern computers have grown tremendously in performance, capabilities, and complexity over the past decade.

A memory cache is a memory bank that bridges main memory and the central processing unit (CPU). A cache is faster than main memory and allows instructions to be executed and data to be read and written at higher speed. Instructions and data are transferred from main memory to the cache in fixed blocks, known as cache "lines."

Caches take advantage of "temporal locality," which means the same data item is often reused many times. Caches also benefit from "spatial locality," wherein the next instruction to be executed or the next data item to be processed is likely to be the next in line. The more often the same data item is processed or the more sequential the instructions or data, the greater the chance for a "cache hit." If the next item is not in the cache, a "cache miss" occurs, and the CPU has to go to main memory or a higher cache level to retrieve it. A level 1 (L1) cache is a memory bank typically built into the CPU chip. A level 2 cache (L2) is a secondary staging area that feeds the L1 cache. Increasing the size of the L2 cache may speed up some applications but have no effect on others. L2 may be built into the CPU chip or may reside on a separate chip or a separate bank of chips.

SUMMARY

In one illustrative embodiment, a method, in a processor, is provided for loading data to a vector register from across multiple cache lines in a data cache. The method comprises receiving a vector load instruction in a load/store unit. The vector load instruction crosses at least one cache line boundary. The method further comprises accessing a first cache line in the data cache to receive a first data portion associated with the vector load instruction, formatting the first data portion for a partial write to the vector register to form a formatted first data portion, and writing the formatted first data portion to the vector register. The method further comprises attempting a second cache line access to access a second cache line in the data cache to receive a second data portion associated with the vector load instruction. Responsive to the second cache line resulting in a cache hit, the method comprises formatting the second data portion for a partial write to the vector register to form a formatted second data portion and writing the formatted second data portion to the vector register thereby loading the data associated with the vector load instruction into the vector register.

In another illustrative embodiment, a load/store unit is provided in a processor for loading data to a vector register from across multiple cache lines. The load/store unit comprises an address generation unit and formatting logic coupled to the address generation unit. The address generation unit is configured to receive a vector load instruction that crosses at least one cache line boundary in the data cache. The load/store unit is configured to access a first cache line to receive a first data portion associated with the vector load instruction. The formatting logic is configured to format the first data portion for a partial write to the vector register to form a formatted first data portion. The load/store unit is configured to write the formatted first data portion to the vector register. The load/store unit is configured to attempt a second cache line access to access a second cache line to receive a second data portion associated with the vector load instruction. Responsive to the second cache line access resulting in a cache hit, the formatting logic is configured to format the second data portion for a partial write to the vector register to form a formatted second data portion and the load/store unit is configured to write the formatted second data portion to the vector register thereby loading the data associated with the vector load instruction into the vector register.

In yet another illustrative embodiment, a processor is provided for loading data to a vector register from across multiple cache lines. The processor comprises an instruction sequencing unit, an issue queue coupled to the instruction sequencing unit, a load/store unit coupled to the issue queue, a data cache coupled to the load/store unit, and a vector register coupled to the load/store unit. The instruction sequencing unit is configured to dispatch instructions to the issue queue. The load/store unit is configured to receive a vector load instruction from the issue queue. The vector load instruction crosses at least one cache line boundary in the data cache. The load/store unit is configured to access a first cache line to receive a first data portion associated with the vector load instruction from the data cache, format the first data portion for a partial write to the vector register to form a formatted first data portion, and write the formatted first data portion to the vector register. The load/store unit is configured to attempt a second cache line access to access a second cache line to receive a second data portion from the data cache. Responsive to the second cache line access resulting in a cache hit, the load/store unit is configured to format the second data portion for a partial write to the vector register to form a formatted second data portion and write the formatted second data portion to the vector register.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for loading data to vector rename register from across multiple cache lines. A load instruction that accesses data cache may be off natural alignment, which causes a cache line crossing to complete the access. The illustrative embodiments provide a mechanism for loading data across multiple cache lines without the need for an accumulation register or collection point for partial data access from a first cache line while waiting for a second cache line to be accessed. Because the accesses to separate cache lines are concatenated within the vector rename register without the need for an accumulator, an off-alignment load instruction is completely pipeline-able and flushable with no cleanup consequences. As long as both cache line accesses result in a cache hit, the mechanism maintains continuity and avoids costly and timely logic additions.

Figure 1:
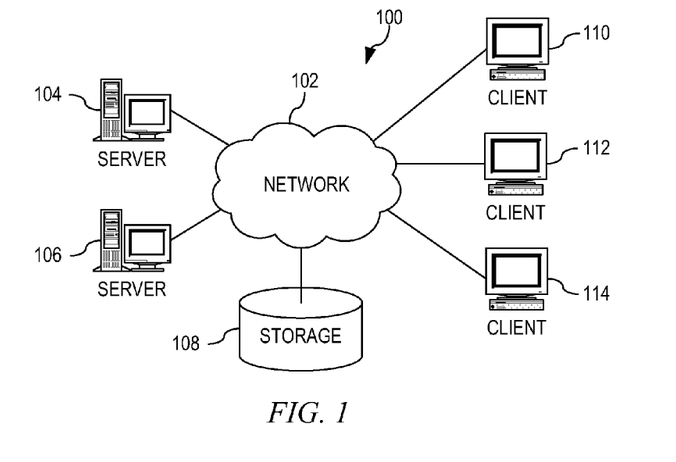
FIG. 1 depicts a pictorial representation of an example distributed data processing system in which aspects of the illustrative embodiments may be implemented.
Figure 2:
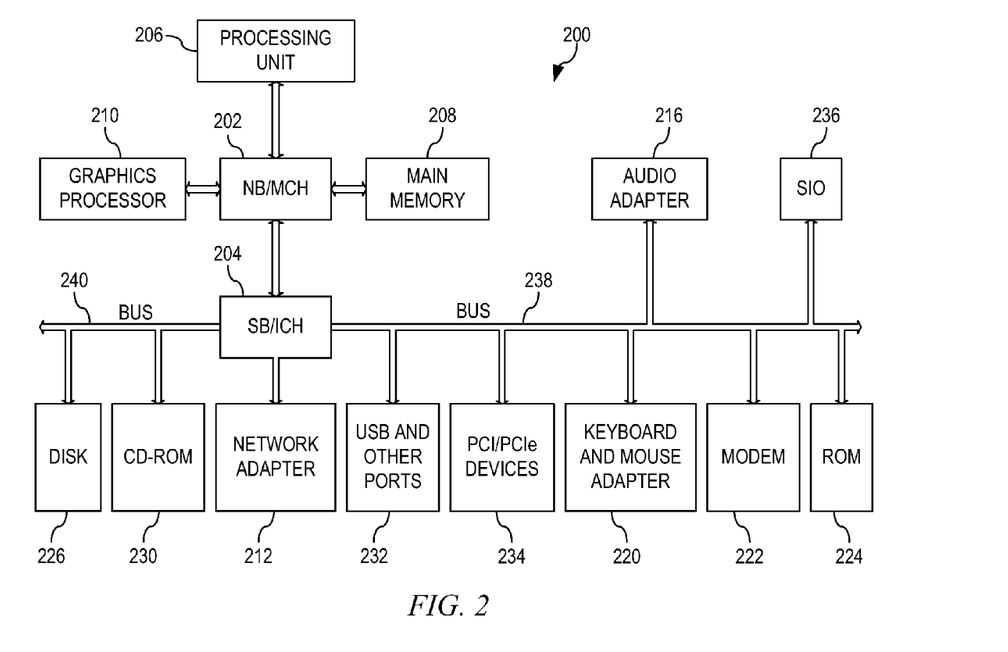
FIG. 2 shows a block diagram of an example data processing system in which aspects of the illustrative embodiments may be implemented.
Figure 3:
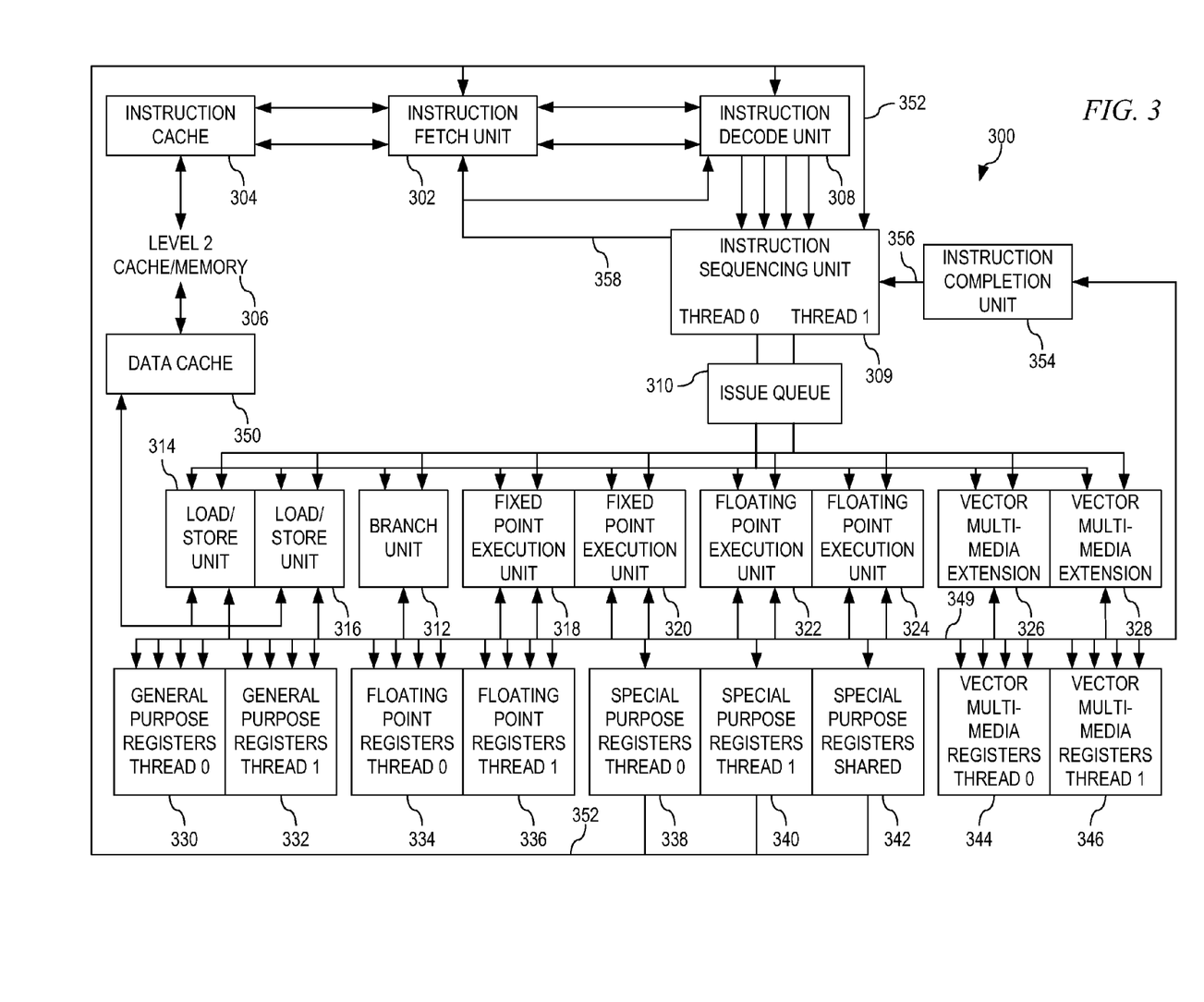
FIG. 3 depicts an exemplary block diagram of a conventional dual threaded processor design showing functional units and registers in accordance with an illustrative embodiment.

The illustrative embodiments may be utilized in many different types of data processing environments including a distributed data processing environment, a single data processing device, or the like. In order to provide a context for the description of the specific elements and functionality of the illustrative embodiments, FIGS. 1-3 are provided hereafter as example environments in which aspects of the illustrative embodiments may be implemented. While the description following FIGS. 1-3 will focus primarily on a single data processing device implementation, this is only an example and is not intended to state or imply any limitation with regard to the features of the present invention. To the contrary, the illustrative embodiments are intended to include distributed data processing environments and embodiments.

With reference now to the figures and in particular with reference to FIGS. 1-3, example diagrams of data processing environments are provided in which illustrative embodiments of the present invention may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Referring to FIG. 3, an exemplary block diagram of a conventional dual threaded processor design showing functional units and registers is depicted in accordance with an illustrative embodiment. Processor 300 may be implemented as processing unit 206 in FIG. 2 in these illustrative examples. Processor 300 comprises a single integrated circuit superscalar microprocessor with dual-thread simultaneous multi-threading (SMT) that may also be operated in a single threaded mode. Accordingly, as discussed further herein below, processor 300 includes various units, registers, buffers, memories, and other sections, all of which are formed by integrated circuitry. Also, in one example embodiment, processor 300 operates according to reduced instruction set computer (RISC) techniques.

As shown in FIG. 3, instruction fetch unit (IFU) 302 connects to instruction cache 304. Instruction cache 304 holds instructions for multiple programs (threads) to be executed. Instruction cache 304 also has an interface to level 2 (L2) cache/memory 306. IFU 302 requests instructions from instruction cache 304 according to an instruction address, and passes instructions to instruction decode unit 308. In an illustrative embodiment, IFU 302 may request multiple instructions from instruction cache 304 for up to two threads at the same time. Instruction decode unit 308 decodes multiple instructions for up to two threads at the same time and passes decoded instructions to instruction sequencing unit (ISU) 309.

Processor 300 may also include issue queue 310, which receives decoded instructions from ISU 309. The issue queue 310 stores instructions awaiting dispatch to the appropriate execution units. In an illustrative embodiment, the execution units of the processor may include branch unit 312, load/store units (LSUA) 314 and (LSUB) 316, fixed point execution units (FXUA) 318 and (FXUB) 320, floating point execution units (FPUA) 322 and (FPUB) 324, and vector multimedia extension units (VMXA) 326 and (VMXB) 328. Execution units 312, 314, 316, 318, 320, 322, 324, 326, and 328 are fully shared across both threads, meaning that execution units 312, 314, 316, 318, 320, 322, 324, 326, and 328 may receive instructions from either or both threads. The processor includes multiple register sets 330, 332, 334, 336, 338, 340, 342, 344, and 346, which may also be referred to as architected register files (ARFs).

An ARF is a file that stores completed data once an instruction has completed execution. ARFs 330, 332, 334, 336, 338, 340, 342, 344, and 346 may store data separately for each of the two threads and by the type of instruction, namely general purpose registers (GPRs) 330 and 332, floating point registers (FPRs) 334 and 336, special purpose registers (SPRs) 338 and 340, and vector registers (VRs) 344 and 346. Separately storing completed data by type and by thread assists in reducing processor contention while processing instructions.

The processor additionally includes a set of shared special purpose registers (SPR) 342 for holding program states, such as an instruction pointer, stack pointer, or processor status word, which may be used on instructions from either or both threads. Execution units 312, 314, 316, 318, 320, 322, 324, 326, and 328 are connected to ARFs 330, 332, 334, 336, 338, 340, 342, 344, and 346 through simplified internal bus structure 349.

In order to execute a floating point instruction, FPUA 322 and FPUB 324 retrieves register source operand information, which is input data required to execute an instruction, from FPRs 334 and 336, if the instruction data required to execute the instruction is complete or if the data has passed the point of flushing in the pipeline. Complete data is data that has been generated by an execution unit once an instruction has completed execution and is stored in an ARF, such as ARFs 330, 332, 334, 336, 338, 340, 342, 344, and 346. Incomplete data is data that has been generated during instruction execution where the instruction has not completed execution. FPUA 322 and FPUB 324 input their data according to which thread each executing instruction belongs to. For example, FPUA 322 inputs completed data to FPR 334 and FPUB 324 inputs completed data to FPR 336, because FPUA 322, FPUB 324, and FPRs 334 and 336 are thread specific.

During execution of an instruction, FPUA 322 and FPUB 324 output their destination register operand data, or instruction data generated during execution of the instruction, to FPRs 334 and 336 when the instruction has passed the point of flushing in the pipeline. During execution of an instruction, FXUA 318, FXUB 320, LSUA 314, and LSUB 316 output their destination register operand data, or instruction data generated during execution of the instruction, to GPRs 330 and 332 when the instruction has passed the point of flushing in the pipeline. During execution of a subset of instructions, FXUA 318, FXUB 320, and branch unit 312 output their destination register operand data to SPRs 338, 340, and 342 when the instruction has passed the point of flushing in the pipeline. Program states, such as an instruction pointer, stack pointer, or processor status word, stored in SPRs 338 and 340 indicate thread priority 352 to ISU 309. During execution of an instruction, VMXA 326 and VMXB 328 output their destination register operand data to VRs 344 and 346 when the instruction has passed the point of flushing in the pipeline.

Data cache 350 may also have associated with it a non-cacheable unit (not shown) which accepts data from the processor and writes it directly to level 2 cache/memory 306. In this way, the non-cacheable unit bypasses the coherency protocols required for storage to cache.

In response to the instructions input from instruction cache 304 and decoded by instruction decode unit 308, ISU 309 selectively dispatches the instructions to issue queue 310 and then onto execution units 312, 314, 316, 318, 320, 322, 324, 326, and 328 with regard to instruction type and thread. In turn, execution units 312, 314, 316, 318, 320, 322, 324, 326, and 328 execute one or more instructions of a particular class or type of instructions. For example, FXUA 318 and FXUB 320 execute fixed point mathematical operations on register source operands, such as addition, subtraction, ANDing, ORing and XORing. FPUA 322 and FPUB 324 execute floating point mathematical operations on register source operands, such as floating point multiplication and division. LSUA 314 and LSUB 316 execute load and store instructions, which move operand data between data cache 350 and ARFs 330, 332, 334, and 336. VMXA 326 and VMXB 328 execute single instruction operations that include multiple data. Branch unit 312 executes branch instructions which conditionally alter the flow of execution through a program by modifying the instruction address used by IFU 302 to request instructions from instruction cache 304.

Instruction completion unit 354 monitors internal bus structure 349 to determine when instructions executing in execution units 312, 314, 316, 318, 320, 322, 324, 326, and 328 are finished writing their operand results to ARFs 330, 332, 334, 336, 338, 340, 342, 344, and 346. Instructions executed by branch unit 312, FXUA 318, FXUB 320, LSUA 314, and LSUB 316 require the same number of cycles to execute, while instructions executed by FPUA 322, FPUB 324, VMXA 326, and VMXB 328 require a variable, and a larger number of cycles to execute. Therefore, instructions that are grouped together and start executing at the same time do not necessarily finish executing at the same time. "Completion" of an instruction means that the instruction is finishing executing in one of execution units 312, 314, 316, 318, 320, 322, 324, 326, or 328, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 354 monitors for the completion of instructions, and sends control information 356 to ISU 309 to notify ISU 309 that more groups of instructions can be dispatched to execution units 312, 314, 316, 318, 320, 322, 324, 326, and 328. ISU 309 sends dispatch signal 358, which serves as a throttle to bring more instructions down the pipeline to the dispatch unit, to IFU 302 and instruction decode unit 308 to indicate that it is ready to receive more decoded instructions.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system, other than the SMP system mentioned previously, without departing from the spirit and scope of the present invention.

When a load instruction accesses data from a cache, the processor must inspect the contents of a store queue for data dependencies. Frequently, high performance designs install a path from the store queue to the output port of the load/store unit (LSU), such as LSU 314 or 316, whereby the dependent store data can be forwarded directly as the result of the load instruction. This "store forwarding," however, cannot take place at the same speed as a typical cache access, which is tightly compartmentalized in a compact design to reduce delay in any form that may increase the normal data cache-hit latency.

Due to the extra time needed in the store queue to correlate controls that measure the containment of the dependent store data and the accessing and formatting of the dependent store data and the physical travel time associated with this forwarding, a "store forwarding" will require an extra set of cycles additional to that of a normal cache-hit load. For the purposes of this disclosure, this will be referred to as the "recycle path" or "recycle mechanism."

The recycle mechanism has two parts: a data part and an instruction part. When the data part has completed its duties and the dependent store data is ready to be transmitted to the central processing unit to finish the load instruction, the LSU must announce to the instruction sequencing unit (ISU), such as ISU 309, the address of the register the load is targeting, steal a cycle away from the normal instruction dispatch issue process to "re-inject" this store forwarding result into the instruction flow, indicate to the ISU whether this store forwarding recycle process has finished successfully, and that dependent instructions awaiting these results can start to dispatch; and, re-inject into the address-generation path of the LSU the addresses and instruction information for the store forwarding result so that the data can be properly formatted/justified.

Such complication, once designed and established in a high-speed processor load/store unit, can now be used in other ways. Whenever there is a cache miss, and data must be in-paged to the cache from a higher level of hierarchical memory, the specific data from the fetched cache line that can satisfy the instruction is commonly bypassed around the storage element (the cache) and multiplexed into the cache output path. Giving the highest possible timing priority to the cache-hit data path logically leaves this path to be a secondary timing priority, and is commonly the "leg" of the cache output multiplexer that is used to insert "other" "non-cache-hit" data into the load results path back to the central processing unit. Frequently, LSU designs allow instructions moving data from special purpose registers or other architected registers to move along the data path of the recycle mechanism.

Figure 4A:
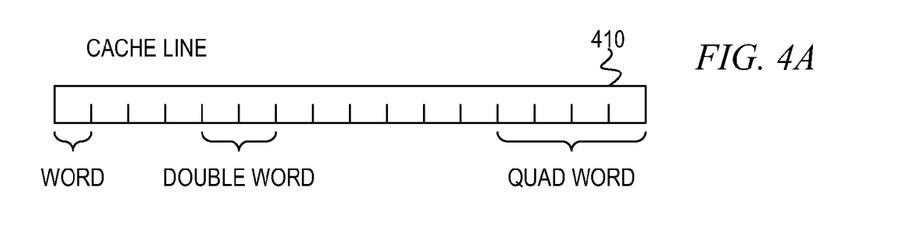
FIGS. 4A-4D illustrate on-alignment and off-alignment cache accesses in accordance with an illustrative embodiment.
Figure 4B:
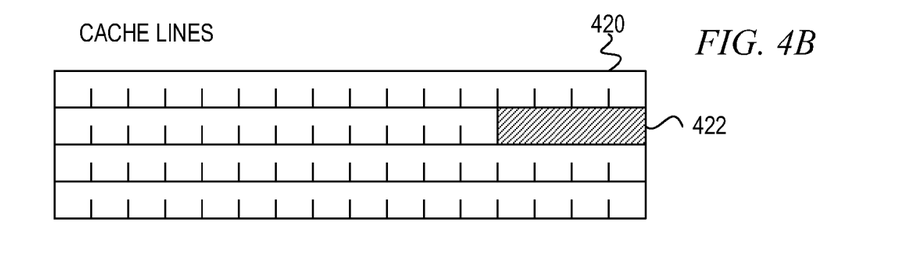

FIGS. 4A-4D illustrate on-alignment and off-alignment cache accesses in accordance with an illustrative embodiment. A typical cache line is 128 bytes. With reference to FIG. 4A, cache line 410 is 128 bytes. In one example convention, a word is 4 bytes, a double word is 8 bytes, and a quad word is 16 bytes. Turning to FIG. 4B, a load/store unit (LSU) may receive a vector load instruction that accesses a large segment of data 422, such as a quad word, within cache lines 420. Because the data 422 naturally aligns with the 128-byte cache line, this data access is considered to be "on-alignment."

Figure 4C:
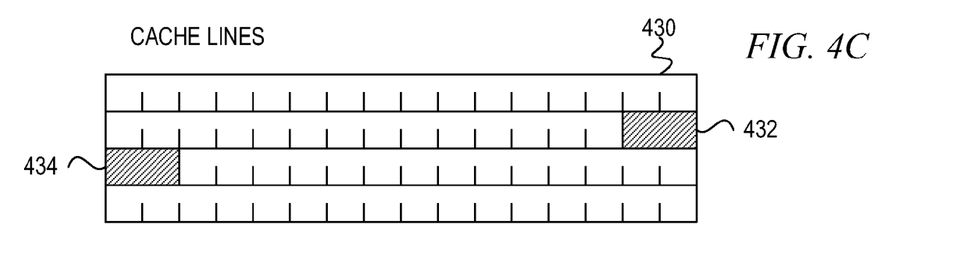
Figure 4D:
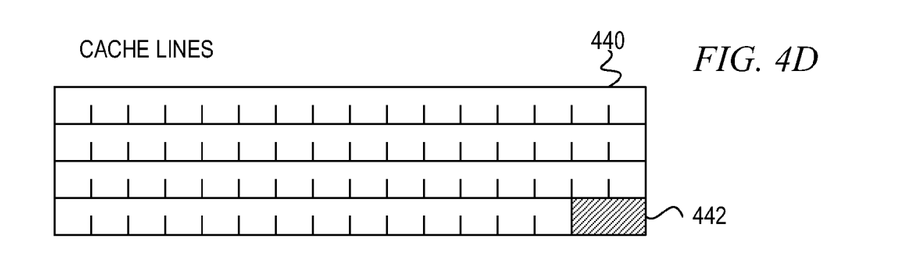

With reference now to FIG. 4C, the LSU may receive a vector load instruction that accesses a segment of data that is "off-alignment," meaning the segment of data does not naturally align with the 128-byte cache line and exists across multiple cache lines. Thus, the LSU must receive a first double word 432 from a first cache line within cache lines 430 and a second double word 434 from a second cache line. FIG. 4D illustrates an off-alignment vector load where the LSU may receive a first double word 442 from a first cache line within cache lines 440, and the second portion of the vector load results in a cache miss.

One example design may employ an "accumulator register" to connect data together from two different cache lines before sending the accumulated data to the vector unit to finish a single write operation to the target vector register. For example, consider the example shown in FIG. 4C. The LSU may receive data 432 from the first cache line with a first cache access and store data 432 in an accumulator register. The LSU may then receive data 434 from the second cache line with a second cache access and concatenate data 434 with the data in the accumulator register. The LSU may then write the concatenated data to the target vector register.

While the use of an accumulator register does indeed allow off-alignment vector load operations, this design has several drawbacks. An accumulator register and the associated logic results in a large and costly design, particularly for multi-threaded core designs, because the LSU may require at least one implementation of the accumulator register per thread to maintain a respectable throughput for all threads. Furthermore, the use of an accumulator register is slow, even if implemented as one accumulator register per thread, because a burst of off-alignment loads means cache boundary crossing conditions could not be maintained in a seamless pipeline.

In accordance with an illustrative embodiment, a load/store unit uses a recycle mechanism to handle a double access to the cache to allow large vector data to be loaded to a vector unit from multiple cache lines. The load/store unit concatenates data received from multiple cache lines in the vector rename register without requiring an accumulator register. The mechanism of the illustrative embodiments is completely pipeline-able and flush-able with no cleanup consequences.

Figure 5:
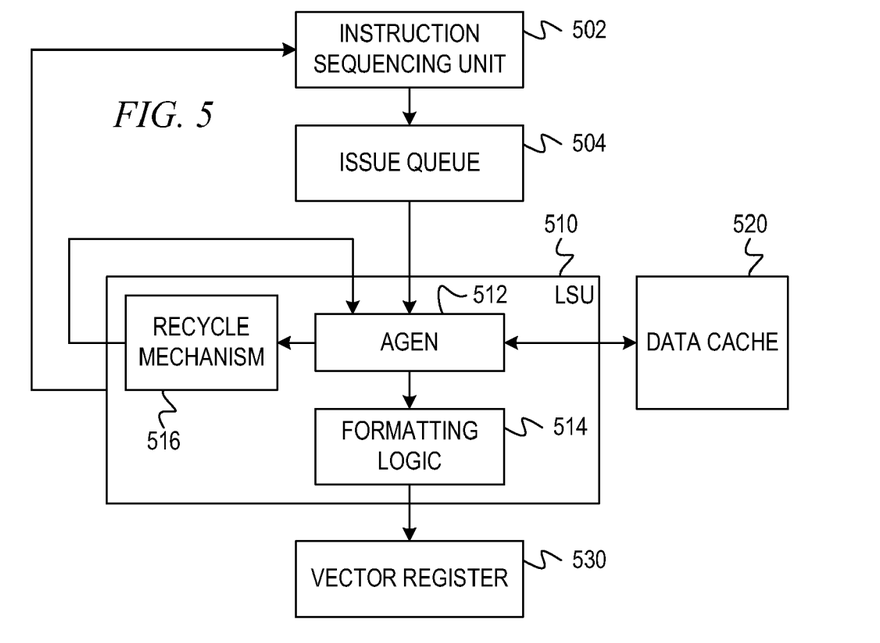
FIG. 5 is a block diagram illustrating a mechanism for loading data to a vector register from across multiple cache lines in accordance with an illustrative embodiment.

FIG. 5 is a block diagram illustrating a mechanism for loading data to a vector register from across multiple cache lines in accordance with an illustrative embodiment. The mechanism shown in FIG. 5 makes fetches to multiple cache lines from instructions for any number of threads seamlessly with respect to the cache line accesses. The mechanism uses target vector register bank 530 with split write control in formatting logic 514. The vector register 530 is divided up into sections of a size that is equivalent to the granularity of the load data to be fetched.

As one example similar to that shown in FIGS. 4A-4D, load store unit (LSU) 510 receives a 16-byte vector load instruction that accesses data across a cache line boundary within data cache 520, whereby the first 8 bytes is in a first cache line and the second 8 bytes is in a second cache line. If vector register 530 is also 16 bytes in size, then formatting logic 514 effects a logical and physical split into two 8-byte sections.

Instruction sequencing unit (ISU) 502 dispatches a vector load instruction to issue queue 504, which issues the vector load instruction to load/store unit (LSU) 510. The address generation (AGEN) unit 512 within LSU 510 determines whether the vector load instruction crosses a cache line boundary by examining data cache 520. If the vector load instruction does not cross a cache line boundary, AGEN 512 accesses the appropriate cache line within data cache 520 and writes the data to vector register 530.

LSU 510 also includes recycle mechanism 516, which may include logic for store forwarding. In accordance with the illustrative embodiment, if AGEN 512 discovers that the vector load instruction does cross a cache line boundary, meaning the data being accessed is off alignment, AGEN 512 continues with the load operation, accessing the first cache line in data cache 520. LSU 510 then writes the data from the first cache line in vector register 530. Formatting logic 514 left justifies the data and performs a partial write to the vector register 530.

For example, if the vector load accesses 16 bytes of data and vector register 530 is 16 bytes and the data is off alignment by 8 bytes, then the first cache line access results in 8 bytes of data. Thus, after the first cache line access, vector register 530 has 8 bytes of "good" data and 8 bytes of "bad" data, because formatting logic 514 writes the 8 bytes received from the first cache line into the first (most significant bit (MSB)) 8 bytes of vector register 530.

AGEN 512 then uses recycle mechanism 516 to recycle the vector load instruction back into the AGEN path of LSU 510. Recycle mechanism 516 increments the vector load instruction to the beginning of the next cache line in data cache 520. AGEN 512 receives the recycled vector load instruction and performs the second cache line read from data cache 520. Formatting logic 514 determines that he data is targeted to the last (least significant bit (LSB)) portion of vector register 530; therefore, formatting logic 514 right justifies the data and performs a partial write to vector register 530 without overwriting the previously written portion.

Given the example above, the second cache line access results in 8 bytes of data. After the second cache line access, vector register 530 has 16 bytes of "good" data, because formatting logic 514 performs two partial writes: one to the MSB portion and one to the LSB portion of vector register 530.

Once LSU 510 writes both portions to vector register 530, the vector load operation is complete. LSU 510 then signals ISU 502 that the address of vector register 530 is available to be used in dependent operations. In a pipelined fashion, there may be any number of virtual registers engaged in this multiple cache line operation simultaneously without impeding the normal course of instruction sequencing and without requiring one or more accumulation registers for each thread.

While the example embodiments described herein show a 16-byte vector load being off alignment by 8 bytes, the aspects of the illustrative embodiments may be applicable to any vector load size, any cache line size, and any off-alignment condition. For example, a load may be off alignment by a single byte. For instance, a 16-byte load may cause a cache line boundary split with 15 bytes in a first cache line and 1 byte in a second cache line, or vice versa.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
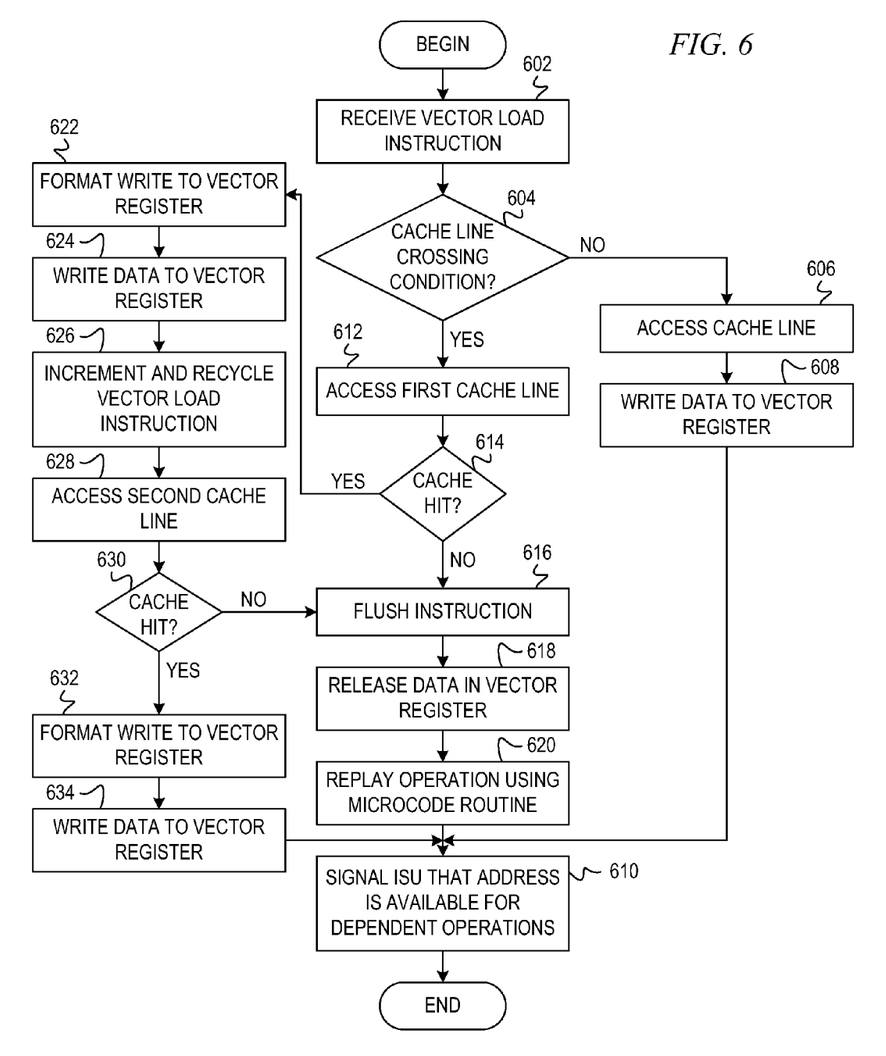
FIG. 6 is a flowchart outlining example operations of a load/store unit for a vector load across multiple cache lines in accordance with an illustrative embodiment.

FIG. 6 is a flowchart outlining example operations of a load/store unit for a vector load across multiple cache lines in accordance with an illustrative embodiment. Operation begins, and the load/store unit (LSU) receives a vector load instruction from the instruction sequencing unit (ISU) (block 602). The address generation (AGEN) unit in the LSU determines whether the vector load instruction results in a cache line crossing condition (block 604). The AGEN may make this determination by examining the addresses in the data cache and determining whether the beginning address and amount of data to be loaded align with a cache line in the data cache.

If the vector instruction is in alignment, and does not result in a cache line crossing condition, the LSU performs a normal vector load operation. That is, the LSU accesses the cache line (block 606), writes the received data to the targeted vector register (block 608), and signals the ISU that the vector rename register address is available for dependent operations (block 610). Thereafter, operation ends. Although not illustrated in FIG. 6, if the cache line access in block 606 results in a cache miss, the LSU may reject the vector load instruction, which may result in the vector load instruction retrying at a later time, at which point the data may be in the data cache. Alternatively, this determination may be performed as part of block 604 where a vector load operation may result in a cache line crossing condition any time the data is not found in a single cache line in the data cache. Operation may repeat beginning at block 602 each time the LSU receives a vector load instruction.

If the vector load instruction is off alignment, which results in a cache line crossing condition in block 604, then the AGEN accesses the first cache line in the data cache (block 612) and determines whether the cache line access results in a cache hit (block 614). If the cache line access does not result in a cache hit (i.e. a cache miss), then the LSU flushes the instruction (block 616) and releases the data in the vector register from the first cache line access (block 618). In the case of a cache miss in block 614, the vector register will not contain any data and block 618 may be disregarded. The processor may then replay the operation using a microcode routine (block 620). Then, operation proceeds to block 610 where the LSU signals the ISU that the vector rename register address is available for dependent operations, and operation ends.

The microcode routine may retry the vector load at a later time, at which point the data may be in the data cache. The operation is flushed, the "bad" data in the VR rename register is released, and the operation may be replayed using a more elemental microcode routine that accesses the cache lines one-at-a-time and reassembles the result in the VR manually. This is shown in more detail below with respect to a cache miss resulting from the second cache line access.

If the first cache line access results in a cache hit in block 614, formatting logic within the LSU formats the data for a partial write to the vector register (block 622). The formatting logic may left justify the data so that it is written to the most significant bit (MSB) portion of the vector register. The LSU writes the formatted data to the vector register (block 624). Then, a recycle mechanism within the LSU increments and recycles the vector load instruction (block 626). Recycling the vector load instruction places the vector load instruction back in the AGEN path of the LSU, which is significantly faster than rejecting and retrying the instruction.

Thereafter, the AGEN receives the recycled vector load instruction and accesses the second cache line (block 628) and determines whether the cache line access results in a cache hit (block 630). If the second cache line access results in a cache hit, the formatting logic formats the data for a partial write to the vector register (block 632). The formatting logic may right justify the data so that it is written to the least significant bit (LSB) portion of the vector register. The LSU writes the formatted data to the vector register (block 634). Then, operation proceeds to block 610 where LSU signals the ISU that the vector rename register address is available for dependent operations, and operation ends.

If the second cache line access results in a cache miss in block 630, the LSU flushes the instruction (block 616) and releases the data in the vector register from the first cache line access (block 618). In the case of a cache hit in block 614 and a cache miss in block 630, the vector register will contain some "good" data with some "bad" data; therefore, the LSU releases all of the data in the vector register in block 618. The processor then replays the operation using a microcode routine (block 620). Thereafter, operation proceeds to block 610 where LSU signals the ISU that the vector rename register address is available for dependent operations, and operation ends.

Figure 7:
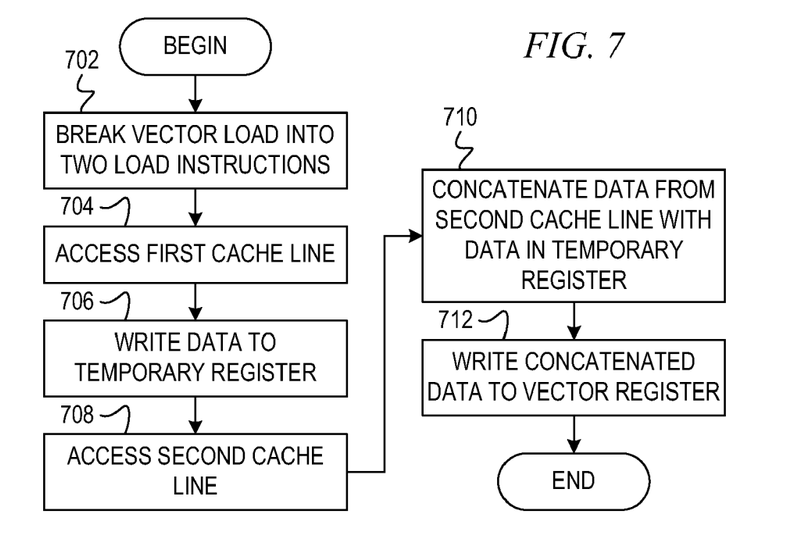
FIG. 7 is a flowchart outlining example operations of a microcode routine for a vector load across multiple cache lines in accordance with one example embodiment.

FIG. 7 is a flowchart outlining example operations of a microcode routine for a vector load across multiple cache lines in accordance with one example embodiment. This microcode routine is meant as an example only. Other microcode routines may be used to effectuate vector loads across cache line boundaries depending upon the implementation. Operation begins, and the microcode routine breaks the vector load instruction into two load instructions accessing two separate cache lines (block 702). In response to the first instruction, the LSU accesses a first cache line (block 704) and writes the data to a temporary register (block 706). In response to the second instruction, the LSU accesses a second cache line (block 708). The microcode routine then concatenates the data from the second cache line access with the data in the temporary register (block 710). Then, the microcode routine writes the concatenated data to the vector register (block 712), and operation ends.

Thus, the illustrative embodiments provide mechanisms for loading data to vector rename register from across multiple cache lines without the need for an accumulation register or collection point for partial data access from a first cache line while waiting for a second cache line to be accessed. Because the accesses to separate cache lines are concatenated within the vector rename register without the need for an accumulator, an off-alignment load instruction is completely pipeline-able and flushable with no cleanup consequences.

As long as both cache line accesses result in a cache hit, the mechanism maintains continuity and avoids costly and timely logic additions. This hit-hit requirement for fast operations may seem to be an oppressive limitation that may negatively affect performance. However, vector operations typically address data in a sequential manner. Therefore, data for vector operations may be pre-fetched in the data cache more easily than other kinds of data. Pre-fetch mechanisms are standard components in high-speed processing cores, so an assumption that data for two cache lines will be present in the data cache is realistic.

General purpose register (GPRs) and virtual registers (VRs) are typically implemented as "rename" registers, which are used as temporary registers to collect results until such time that the writing instruction completes successfully. This temporary register gets established as a renamed substitute for an architected register. Thus, at any time before the load operation completes, the target VR may be "flushed" when it becomes clear that the load operation will not complete successfully.

Reasons for flushing a vector load operation may include, for example, branch not taken, LSU addressing alignment problems, out-of-order sequence dependent corrections such as store-hit-load, and so forth. In the illustrative embodiments described above, the LSU may have two additional reasons to flush a vector load instruction when access to its data crosses a cache line boundary, because accesses to both cache lines must be cache hits. This allows the mechanisms of the illustrative embodiments to operate within the confines already defined by the highest speed recycle mechanism.

The recycle mechanism of the illustrative embodiments promises to deliver data to the target register and to signal to the ISU to dispatch held back dependent operations in a fixed number of cycles from the engagement of the recycle mechanism. The one case that does not conform to this restriction is whenever there is a cache miss and data must be in-paged to the cache from a higher level of hierarchical memory. The fetch may take an unknown amount of time. Therefore, whenever either of the cache line accesses causes a miss, the operation is flushed, the "bad" data in the VR rename register is released, and the operation may be replayed using a more elemental microcode routine that accesses the cache lines one-at-a-time and reassembles the result in the VR manually.

As an alternative embodiment, the LSU may reject rather than recycle a vector load that crosses a cache line boundary. The LSU must then keep track of the instruction as an off-alignment instruction to concatenate the data from the replayed instruction with the data from the first cache line access. Rejecting a vector load instruction that crosses a cache line boundary would take longer and would require more logic for managing rejected and replayed instructions; however, this would be a viable alternative for a LSU that does not have a recycle mechanism.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a processor, for loading data to a vector register from across multiple cache lines in a data cache, the method comprising:
  receiving a vector load instruction in a load/store unit, wherein the vector load instruction crosses at least one cache line boundary;
  accessing a first cache line in the data cache to receive a first data portion associated with the vector load instruction;
  formatting the first data portion for a partial write to the vector register to form a formatted first data portion and writing the formatted first data portion to the vector register;
  attempting a second cache line access to access a second cache line in the data cache to receive a second data portion associated with the vector load instruction;
  responsive to the second cache line resulting in a cache hit, formatting the second data portion for a partial write to the vector register to form a formatted second data portion and writing the formatted second data portion to the vector register thereby loading the data associated with the vector load instruction into the vector register.

2. The method of claim 1, wherein formatting the first data portion comprises left justifying, by formatting logic in the load/store unit, the first data portion to the most significant bit portion of the vector register.

3. The method of claim 1, wherein formatting the second data portion comprises right justifying, by formatting logic in the load/store unit, the second data portion to the least significant bit portion of the vector register.

4. The method of claim 1, wherein attempting the second cache line access comprises recycling the vector load instruction using a recycle mechanism to return the vector load instruction to the load/store unit for attempting the second cache line access.

5. The method of claim 4, wherein the vector load instruction is off-alignment with the first cache line by an off-alignment amount equal to a size of the first data portion and wherein recycling the vector load instruction comprises increasing an address of the vector load instruction by the off-alignment amount and decreasing a size of the vector load instruction by the off-alignment amount.

6. The method of claim 1, further comprising:
  responsive to the second cache line access resulting in a cache miss, flushing the vector load instruction and replaying the vector load instruction using a microcode routine that divides the vector load instruction into two or more vector load instructions that do not cross a cache line boundary.

7. The method of claim 1, further comprising:
  signaling, by the load/store unit, an instruction sequencing unit in the processor that an address of the vector register is available for dependent operations responsive to writing the formatted second data portion to the vector register such that the instruction sequencing unit subsequently dispatches at least one dependent instruction that performs an operation on the data stored in the vector register.

8. A load/store unit, in a processor, for loading data to a vector register from across multiple cache lines in a data cache, the load/store unit comprising:
  an address generation unit; and
  formatting logic coupled to the address generation unit,
  wherein the address generation unit is configured to receive a vector load instruction that crosses at least one cache line boundary in the data cache;
  wherein the load/store unit is configured to access a first cache line to receive a first data portion associated with the vector load instruction;
  wherein the formatting logic is configured to format the first data portion for a partial write to the vector register to form a formatted first data portion;
  wherein the load/store unit is configured to write the formatted first data portion to the vector register;
  wherein the load/store unit is configured to attempt a second cache line access to access a second cache line to receive a second data portion associated with the vector load instruction; and
  wherein responsive to the second cache line access resulting in a cache hit, the formatting logic is configured to format the second data portion for a partial write to the vector register to form a formatted second data portion and the load/store unit is configured to write the formatted second data portion to the vector register thereby loading the data associated with the vector load instruction into the vector register.

9. The load/store unit of claim 8, wherein formatting the first data portion comprises left justifying the first data portion to the most significant bit portion of the vector register.

10. The load/store unit of claim 8, wherein formatting the second data portion comprises right justifying the second data portion to the least significant bit portion of the vector register.

11. The load/store unit of claim 8, further comprising:
a recycle mechanism coupled to the address generation unit, wherein attempting the second cache line access comprises recycling the vector load instruction using the recycle mechanism to return the vector load instruction to a path of the address generation unit for attempting the second cache line access.

12. The load/store unit of claim 11, wherein the vector load instruction is off-alignment with the first cache line by an off-alignment amount equal to a size of the first data portion and wherein the recycle mechanism is configured to increase an address of the vector load instruction by the off-alignment amount and decrease an amount of the vector load instruction by the off-alignment amount.

13. The load/store unit of claim 8, wherein the load/store unit is configured to flush the vector load instruction and replay the vector load instruction using a microcode routine that divides the vector load instruction into two or more vector load instructions that do not cross a cache line boundary responsive to the second cache line access resulting in a cache miss.

14. The load/store unit of claim 8, wherein the load/store unit is configured to signal an instruction sequencing unit that an address of the vector register is available for dependent operations responsive to writing the formatted second data portion to the vector register such that the instruction sequencing unit subsequently dispatches at least one dependent instruction that performs an operation on the data in the vector register.

15. A processor for loading data to a vector register from across multiple cache lines, the processor comprising:
an instruction sequencing unit;
an issue queue coupled to the instruction sequencing unit;
a load/store unit coupled to the issue queue;
a data cache coupled to the load/store unit; and
a vector register coupled to the load/store unit,
wherein the instruction sequencing unit is configured to dispatch instructions to the issue queue;
wherein the load/store unit is configured to:
receive a vector load instruction from the issue queue, wherein the vector load instruction crosses at least one cache line boundary in the data cache;
access a first cache line to receive a first data portion associated with the vector load instruction from the data cache;
format the first data portion for a partial write to the vector register to form a formatted first data portion;
write the formatted first data portion to the vector register;
attempt a second cache line access to access a second cache line to receive a second data portion from the data cache; and
responsive to the second cache line access resulting in a cache hit, format the second data portion for a partial write to the vector register to form a formatted second data portion and write the formatted second data portion to the vector register.

16. The processor of claim 15, wherein formatting the first data portion comprises left justifying the first data portion to the most significant bit portion of the vector register; and
wherein formatting the second data portion comprises right justifying the second data portion to the least significant bit portion of the vector register.

17. The processor of claim 15, wherein attempting the second cache line access comprises recycling the vector load instruction using a recycle mechanism to return the vector load instruction to the load/store unit for attempting the second cache line access.

18. The processor of claim 17, wherein the vector load instruction is off-alignment with the first cache line by an off-alignment amount equal to a size of the first data portion and wherein recycling the vector load instruction comprises increasing an address of the vector load instruction by the off-alignment amount and decreasing a size of the vector load instruction by the off-alignment amount.

19. The processor of claim 15, wherein the load/store unit is configured to flush the vector load instruction and replay the vector load instruction using a microcode routine that divides the vector load instruction into two or more vector load instructions that do not cross a cache line boundary responsive to the second cache line access resulting in a cache miss.

20. The processor of claim 15, wherein the load/store unit is configured to signal the instruction sequencing unit that an address of the vector register is available for dependent operations responsive to writing the formatted second data portion to the vector register such that the instruction sequencing unit subsequently dispatches at least one dependent instruction that performs an operation on the data in the vector register.

* * * * *